July 9, 1968 W. A. KINKAID ET AL 3,391,758
DISPENSING MERCHANDISE BY INDIVIDUAL SELF-SERVICE
Original Filed April 26, 1965 5 Sheets-Sheet 5

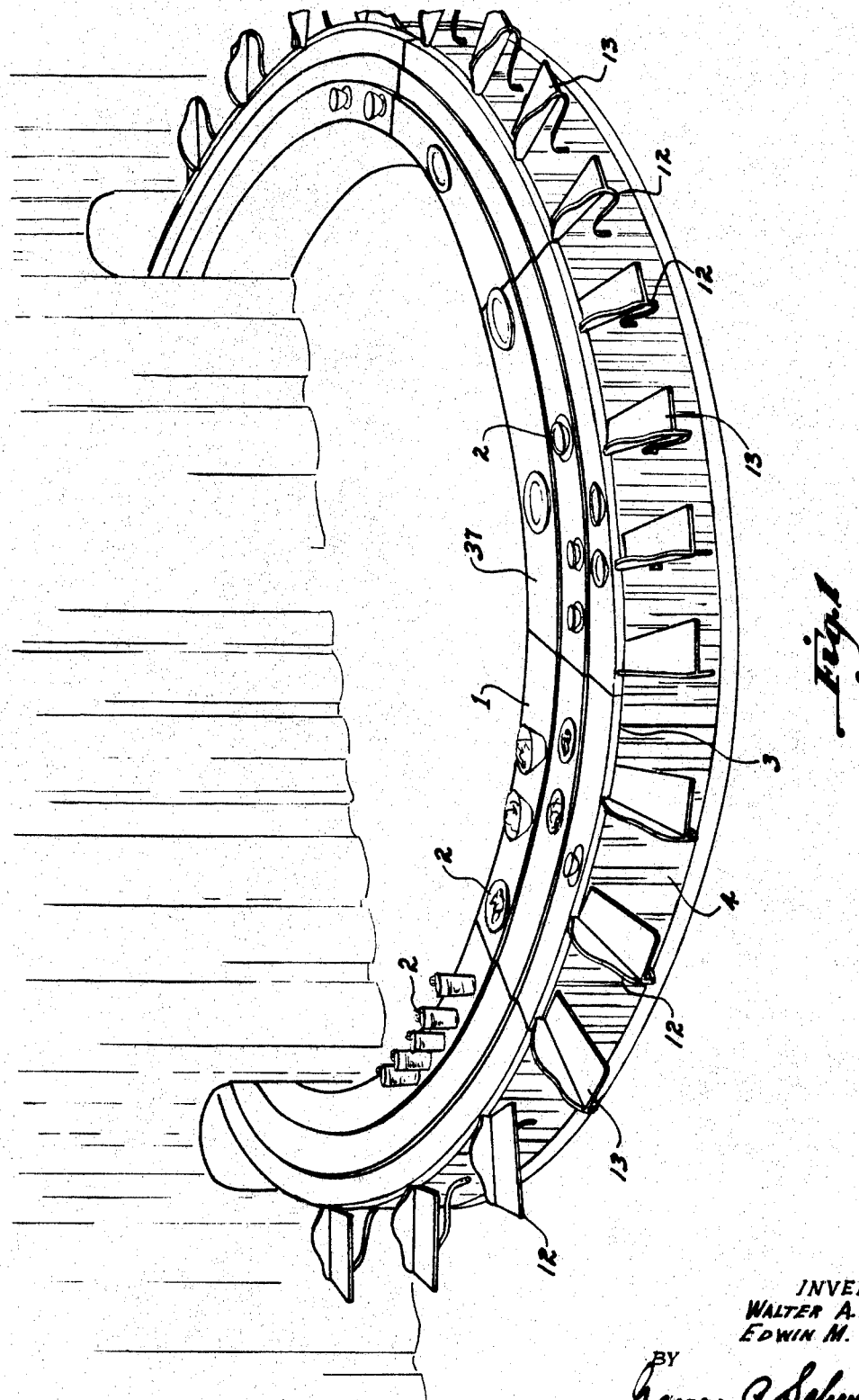

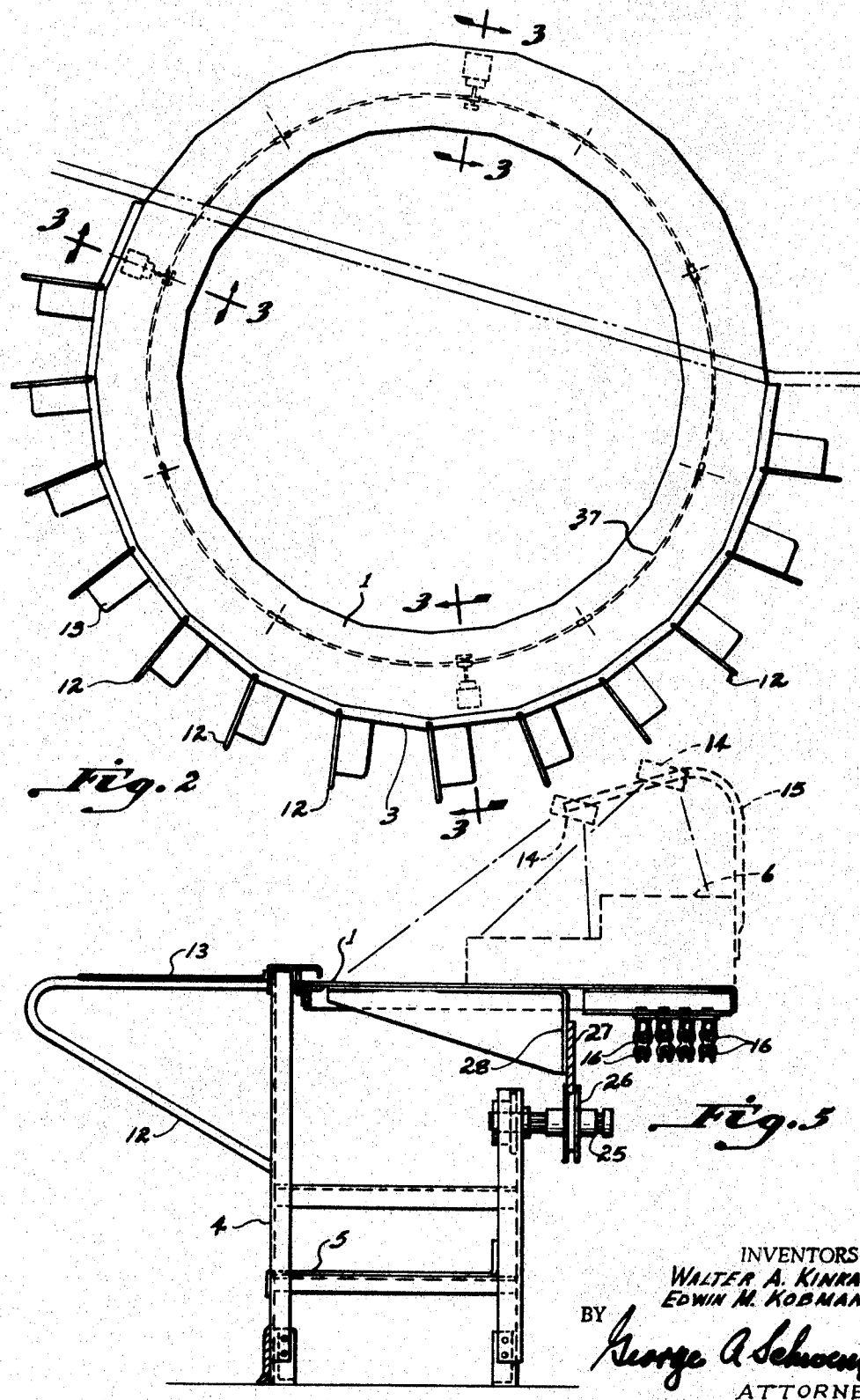

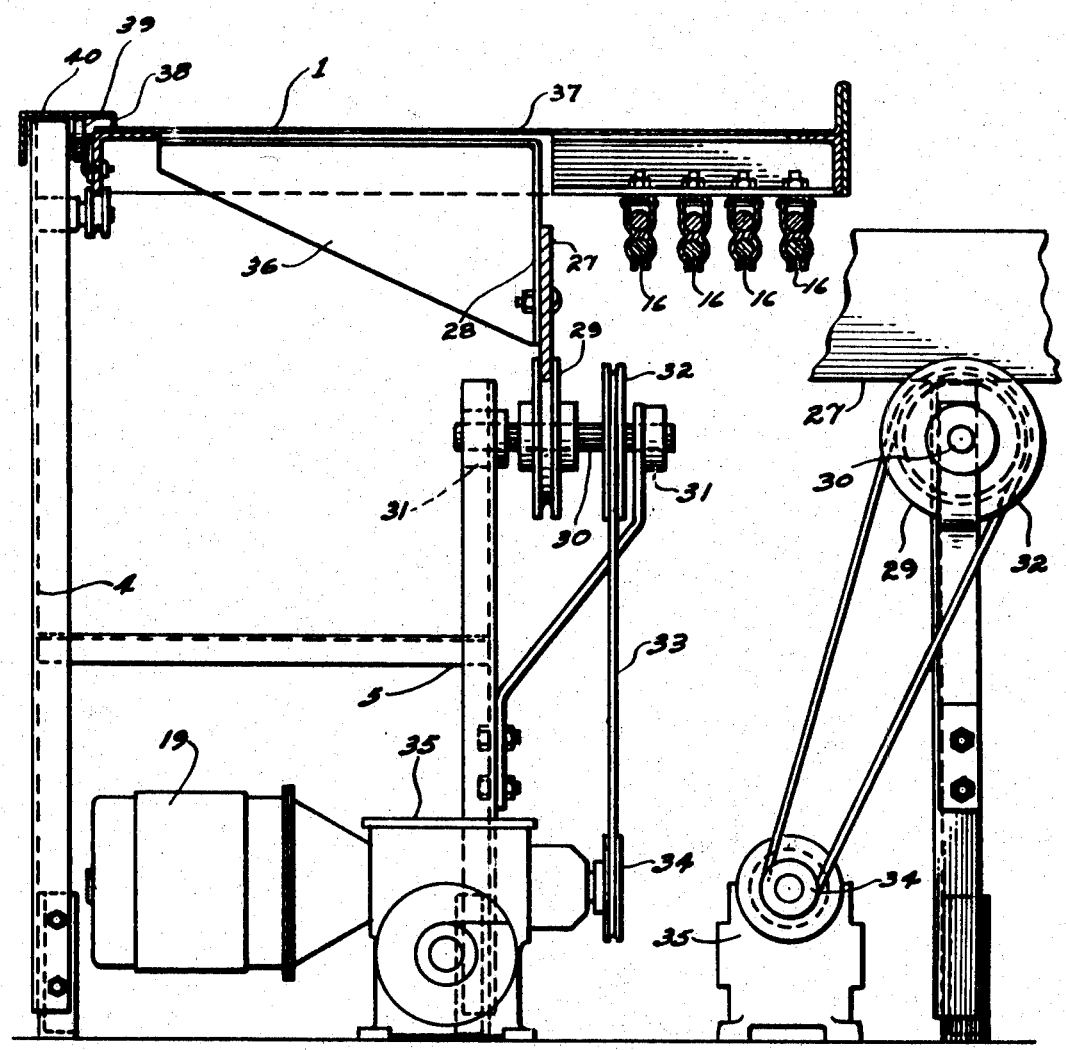

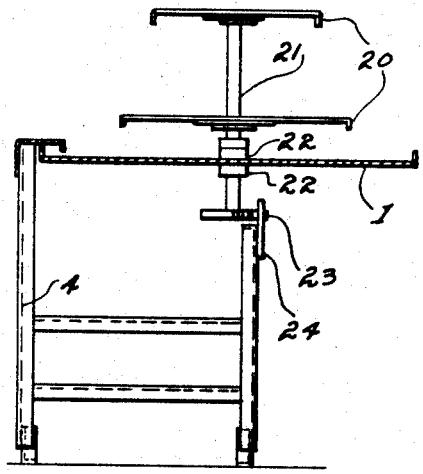
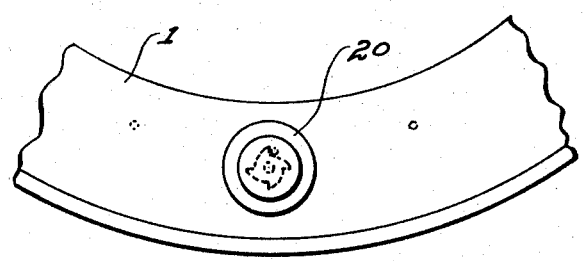
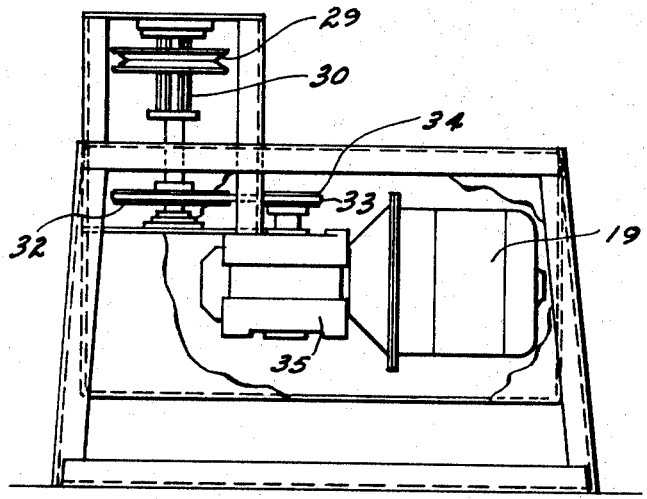

INVENTORS
WALTER A. KINKAID
EDWIN M. KOBMAN
BY George A. Schwenzer
ATTORNEY.

United States Patent Office 3,391,758
Patented July 9, 1968

3,391,758
DISPENSING MERCHANDISE BY
INDIVIDUAL SELF-SERVICE
Walter A. Kinkaid, 884 Old Orchard Road 45230, and
Edwin M. Kobman, 3460 Camellia Court 45211, both
of Cincinnati, Ohio
Continuation of application Ser. No. 450,692, Apr. 26,
1965. This application Jan. 24, 1967, Ser. No. 611,466
4 Claims. (Cl. 186—1)

ABSTRACT OF THE DISCLOSURE

This application discloses a continuous rotating circular counter for self serving of merchandise displayed on the counter. Persons serving themselves from the counter are held stationary and inhibited from following the counter around while self-serving from the counter. It teaches a novel means of rotatable supports while the counter is driven by sheaved pulleys frictionally engaging a keel secured to and driving said circular counter.

---

This application is a continuation of Ser. No. 450,692, filed Apr. 26, 1965, now abandoned.

This invention relates to the cafeteria method for serving food to a multiple of persons simultaneously from a rotating counter while the persons serving themselves are held stationary in a captive fixed position around the rotating counter.

It is an object of the invention to provide a rotating counter for the display of assorted merchandise having spaced fixed barriers extending from and around the perimeter of said counter, said barriers providing spaces wherein persons selecting merchandise will be held in fixed position around the perimeter of the rotating counter and thereby prevent the persons from following the counter around during the rotation of the counter and while a multiple of persons are selecting and taking merchandise from said rotating counter.

Another object is to provide a rotating circular cafeteria counter upon which is displayed assorted dished hot and cold foods, together with means for keeping hot foods hot and cold foods cold while they are on and rotatable with the counter together with the fixed stalls to keep persons in fixed position about said counter while the persons are selecting and taking food from said rotating counter.

These and other objects will become apparent from the drawings in combination with these specifications describing the preferred embodiment of the invention.

FIGURE 1 is a perspective view of the counter showing the barriers extending from the counter.

FIGURE 2 is a top plan view of the counter.

FIGURE 3 is a view in elevation of a driving mechanism taken on lines 3—3 of FIGURE 2.

FIGURE 4 is a side view in elevation of the driving mechanism shown in FIGURE 3.

FIGURE 5 is a sectional view in elevation taken on line 3—3 wherein a motor and gear unit are omitted.

FIGURE 6 is a top view showing a complete driving mechanism.

FIGURE 7 is a section of a frame, counter, and rotating display discs supported on and rotating with the counter.

FIGURE 8 is a fragmentary plan view showing a star wheel for rotating the display discs shown in FIGURE 7.

Figures 9, 10:
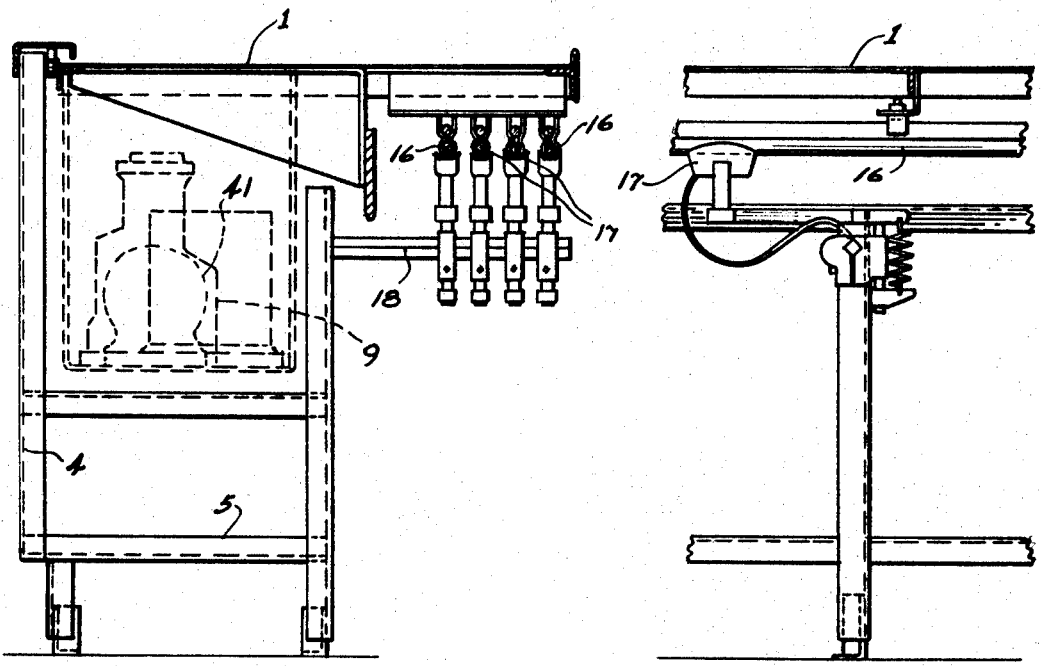
FIGURE 9 is a fragmentary section of the frame and rotating counter with a refrigerating compressor secured to the underside of the counter, also the electrical conductors supported on and rotatable with the counter.
FIGURE 10 is a fragmentary side elevation looking towards the left of FIGURE 9.
Figures 11, 12:
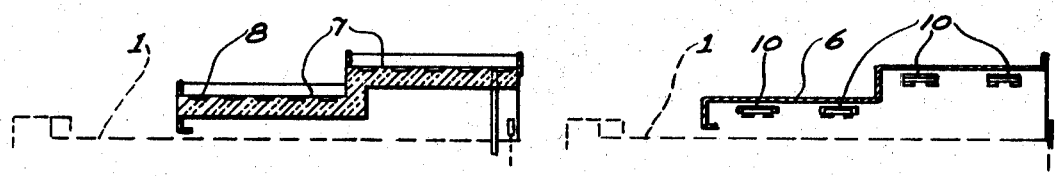
FIGURE 11 is a schematic illustration of cold plates secured on the counter.
FIGURE 12 is a schematic illustration of heating units secured on the counter.

Referring to FIGURES 1 and 2 there is illustrated a circular counter 1 that is rotated in a counter clockwise direction at a rate of movement that allows ample time to view, select and take items of assorted merchandise 2 from the counter while it is moving towards a person positioned before and around a perimeter 3 of the counter. A stationary fixed casing 4 is secured to frame work 5 that is also stationary and fixed to a floor that supports the counter. The casing extends around the frame in a self serving area for decorative purposes while the frame work is a closed circle equal to the size of the circular counter. The counter is illustrated as a flat circular ring and is adapted to support stepped and tiered display shelves 6, also hollow basin like receptacles 7 for ice and other cooling medium. Refrigerating coils 8 are secured on the counter in certain areas for maintaining certain foods refrigerated and these coils have pipes (not shown) to a refrigerant compressor 9 that is secured to the underside of the counter and rotatable with the counter.

In other sections of the counter there are electrical heating elements 10 that keep foods hot while rotating with and on the counter. Fixed to and stationary with the casing there are a multiple of spaced barriers 12 circumferentially around the counter upon which are supported tray rests 13. These barriers prevent persons from following around the counter as it moves in front of them thereby insuring that a person remains fixed in front of the counter and from interfering with other persons also in front of the counter.

An alternate means for keeping foods warm is accomplished by means of heating lamps or coils 14 supported on brackets 15 that are secured to the counter and rotated with the counter. Electrical energy is supplied to these heating elements and the refrigeration compressor by electrical cables 16 secured to and around the counter and rotatable with it. Trolleys 17 are fixedly supported on a bracket 18 that is fixed to the stationary frame. Wiring (not shown) from the main electrical power source are connected to the trolleys in such a manner that the cables are energized electrically by the trolleys. A single switch energizes or de-energizes the cable, and stops and/or starts a motor 19 that drives the counter, the motor for the refrigeration compressor, the heating units and the lamps simultaneously.

An additional display turn table 20 has a rotatable spindle 21 rotatably supported in bearing blocks 22 that are fixed on the counter. On a bottom end of the spindle there is fixed a star wheel 23 which rotates the spindle. The star wheel and spindle are rotated by means of a multiple of trip bars 24 when an arm of the star wheel comes in contact with the bars. The bars are spaced and fixed at various locations around on the fixed frame. As the counter rotates it carries the turn table with it. When the star wheel comes in contact with a trip bar it rotates one quarter of a turn causing the turn table to make a quarter turn and display different merchandise spaced on the turn table. As the star wheel moves away from and out of contact with the trip bar the turn table comes to rest and remains at rest until the star wheel reaches the next trip bar. Fixed in the frame there are a multiple of studs 25 upon which are rotatably supported idler shived pulleys 26. These idler pulleys support a frictionally driven keel 27 that extends around and is fixed on an inner perimeter 28 of the counter. The keel, in combination with the idler and grooved friction pulley 29, are the means for supporting and rotating the counter. The grooved pulley 29 is rotatable with and slidable on a splined shaft 30 that is rotatable in bearings 31 that are secured to the frame. Another pulley 32 is fixed on and rotates the splined shaft with the friction pulley that drives the keel and thereby the counter. A belt 33 connects the pulley 32 to a motor pulley 34 that is fixed on a shaft from a reduction gear unit 35 that is directly connected to and driven by the motor 19 that receives its electrical energy by wires (not shown) from the cables. Extending from and secured to the keel there are a multiple of cantilever brackets 36 on which is supported the top 37 of the counter. These brackets are spaced around and fixed to the keel and rotate with the keel and counter as a unit. Spaced around the perimeter 38 of the counter there are rollers 39 on fixed studs and the rollers are free to rotate on an underside of a circumferential cover and guard plate 40. The rollers insure smooth free movement of the counter and the support for the counter while it rotates. Suspended from and secured to the underside of the counter, and rotatable with it, there is a platform on which the refrigerant compressor is secured. This compressor is driven by an electrical motor 41 that receives its electrical energy through wires (not shown) that are connected to the cables 16. The novel means for driving our counter provides a continuous non-vibrating movement and insures that no liquids on the counter will be spilled as the counter moves through the display area. The trolley and cable system of electrical wiring insures the supply of electrical energy to all apparatus requiring electrical energy and permits the apparatus to be carried around, on and with the counter while it is rotating.

Having described our invention we claim:

1. A rotatable display counter having radially disposed barriers to inhibit customers from following the rotation of the counter comprising:
   an annular top elevated in a plane above the floor level for displaying and serving units of dished foods;
   a plurality of spaced support brackets secured beneath said annular top for supporting the same, said brackets each having a downwardly depending flange along the inner portion thereof;
   said annular top extending outwardly in cantilever fashion beyond the downwardly depending flanges of said brackets;
   an annular keel secured to the downwardly depending flanges of said brackets;
   a stationary frame for supporting said annular rotatable top;
   a plurality of spined shafts journalled in and extending radially from said stationary frame beneath said annular keel;
   a respective grooved pulley slidably mounted on each of said splined shafts and tracking against the lower edge portion of said annular keel for supporting the weight load of said annular top which is imposed upon said keel by said brackets, said pulleys being shiftable radially with respect to said splined shafts, thereby to accommodate variations in the concentricity of said annular keel;
   at least one power unit mounted in a stationary position with reference to said frame beneath the annular top;
   a driving element slidably keyed to at least one of said splined shafts and interconnected with said power unit for rotating at least one of said grooved pulleys, whereby said driving element rotates said grooved pulley and imparts rotary motion thereto for frictionally rotating the annular keel and annular top while the remaining of said grooved pulleys acts as idlers for supporting the weight load of the annular top relative to the fixed frame.

2. A rotatable display counter as set forth in claim 1 in which the outer periphery of the annular top includes a downwardly depending annular flage, slidable grooved rollers journalled on the stationary frame and tracking against the lower edge portion of the flange and in which the frame includes an annular guard plate overhanging the outer peripheral portion of the annular top, with rollers journalled on the said annular flange of the top and tracking against the lower surface of the guard plate, whereby vibration is eliminated and the top is stabilized in the horizontal plane and is centered for rotation about a vertical axis.

3. A rotatable display counter as set forth in claim 2 in which the stationary frame includes bearings journalling the outer end portions of said splined shafts and in which the frame includes brackets extending inwardly from the frame and disposed beneath the inner overhanging portion of the annular top, each of said brackets including an outboard bearing journalling the outer end portion of the splined shafts for stabilizing the shafts.

4. A rotatable display counter having radially disposed barriers to prevent customers from following the rotation of the counter while serving themselves, comprising:
   an annular rotatable top elevated above floor level for displaying and serving units of dished foods available for self service to the customers held in stationary position;
   a plurality of spaced support brackets secured beneath said annular top for supporting the same, said brackets each having a downwardly depending flange;
   an annular keel secured to the downwardly depending flanges of said brackets;
   a stationary annular frame for supporting said rotatable annular top;
   a plurality of rotatable shafts extending inwardly radially from said frame beneath said annular keel;
   a respective grooved pulley slidably mounted on each of said shafts and tracking against the lower edge portion of said annular keel for supporting the weight load of said annular top which is imposed upon said keel by said brackets, said pulleys being slidably keyed to said shafts and being slidabe along said shafts, thereby to accommodate variations in concentricity of said annular keel and thereby preventing the transmission of vibrations to the counter;
   at least one power unit mounted in a stationary position with reference to said frame beneath the annular top;
   a driving element slidably keyed to at least one of said shafts and interconnected with said power unit for rotating at least one of said grooved pulleys whereby said driving element rotates said grooved pulley and imparts rotary motion thereto for frictionally rotating the annular keel and annular top while the remaining of said grooved pulleys act as idlers for supporting the weight load of the annular top relative to the fixed frame.

References Cited

UNITED STATES PATENTS

| | | | |
|---|---|---|---|
| 1,809,951 | 6/1931 | Vilfordi | 186—1 |
| 2,968,363 | 1/1961 | Kinkaid | 186—1 |
| 3,091,815 | 6/1963 | Krawiec | 186—1 X |

SAMUEL F. COLEMAN, *Primary Examiner.*